Jan. 6, 1953          A. C. STOVER          2,624,593
PIVOTED MOUNTING FOR VEHICLE SUSPENSION SPRINGS
Filed Oct. 3, 1949          2 SHEETS—SHEET 1
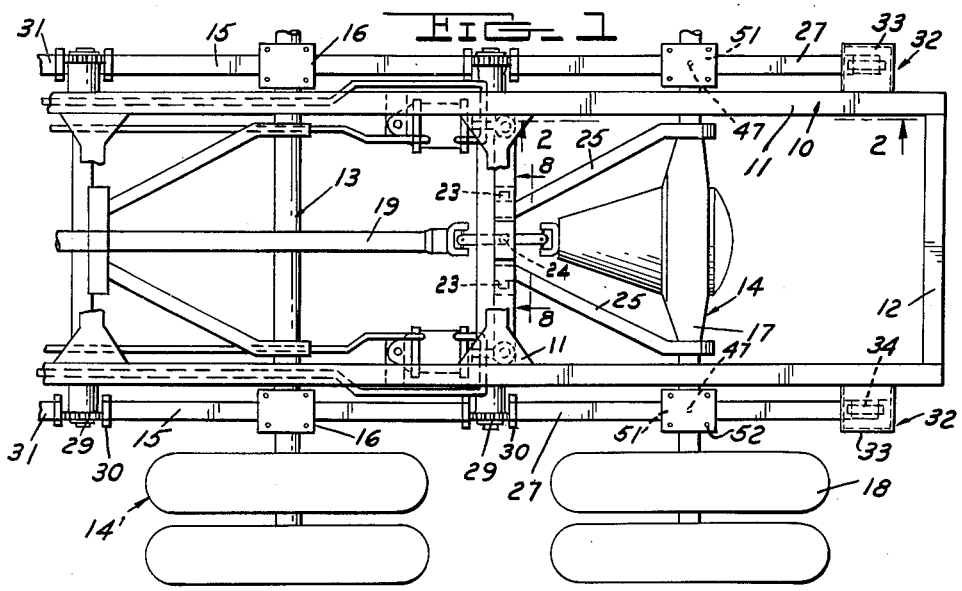
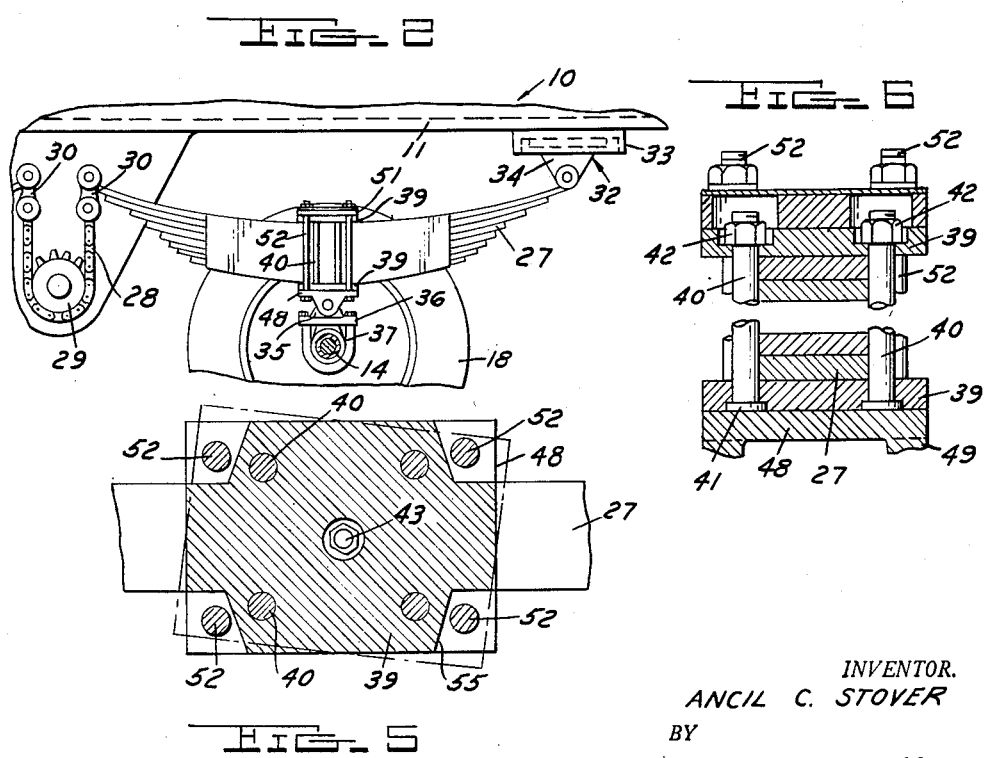
INVENTOR.
ANCIL C. STOVER
BY
*Whittemore Hulbert & Belknap*
ATTORNEYS

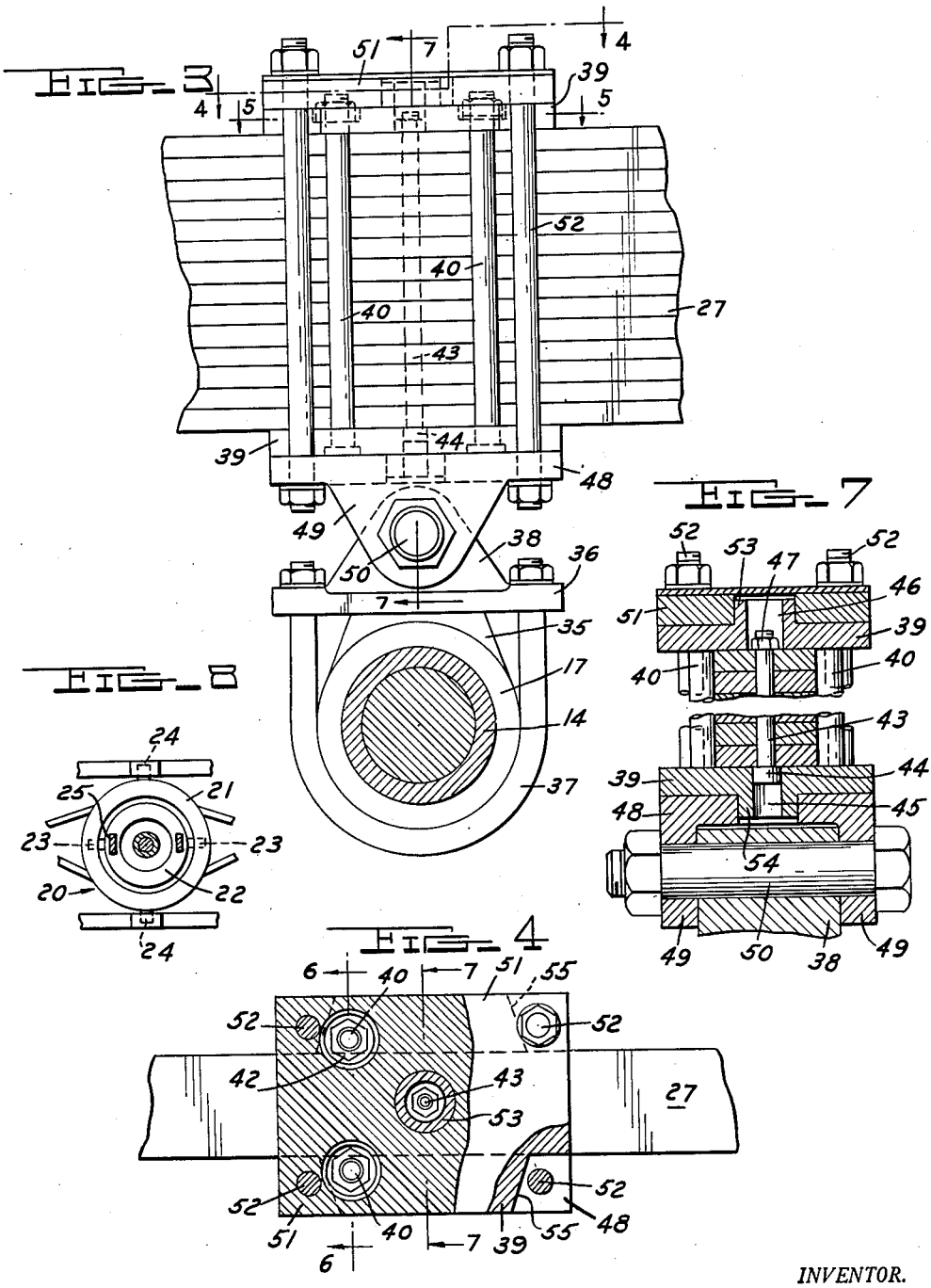

Patented Jan. 6, 1953

2,624,593

UNITED STATES PATENT OFFICE 2,624,593

PIVOTED MOUNTING FOR VEHICLE SUSPENSION SPRINGS

Ancil C. Stover, Van Wert, Ohio, assignor to William W. Eisenhauer, William P. Ellwood, Ida J. Eisenhauer, and Leigh E. Eisenhauer, copartners, doing business as The Eisenhauer Manufacturing Company, Van Wert, Ohio Application October 3, 1949, Serial No. 119,224

12 Claims. (Cl. 280—104.5)

1

This invention relates generally to vehicles of the type having an axle supported for steering or turning movement about a substantially vertical axis and refers more particularly to an improved mounting of the suspension springs on the axle.

In accordance with this invention, the suspension springs extend substantially parallel to opposite sides of the vehicle frame and the ends of the springs are supported on the frame for fore and aft movement relative thereto. Also the central portions of the springs are mounted on the axle and it is an object of this invention to provide a mounting which enables pivotal movement of the axle relative to the springs about axes extending generally parallel to the axis of steering or turning movement of the axle. The arrangement is such that movement of the axle about its steering axis is accomplished without appreciably disturbing the normal parallel relationship between the suspension springs and the frame.

It is another object of this invention to provide a mounting for the suspension springs on the axle which also enables rocking movement of the axle relative to the springs about an axis extending substantially parallel to the axle. Thus the axle is articulated to the frame in a manner to assure freedom of movement of both the springs and the axle.

The foregoing as well as other objects will be made more apparent as this description proceeds, especially when considered in connection with the accompanying drawings, wherein:

Figure 1 is a semi-diagrammatic plan view of a vehicle chassis frame embodying spring mountings of the type forming the subject matter of this invention;

Figure 2 is a sectional view taken on the plane indicated by the line 2—2 of Figure 1;

Figure 3 is a fragmentary enlarged side elevational view partly in section of the spring mounting;

Figure 4 is a sectional view taken on the line 4—4 of Figure 3;

Figure 5 is a sectional view taken on the line 5—5 of Figure 3;

Figures 6 and 7 are respectively sectional views taken on the lines 6—6 and 7—7 of Figure 4, and Figure 8 is a sectional view taken on the line 8—8 of Figure 1.

The suspension spring mounting forming the subject matter of this invention may be used to advantage in practically any type of road vehicle having a pivoted axle but is especially adapted

2 for use in connection with tandem-axle vehicles wherein at least one axle is supported for steering movement about a substantially vertical axis to increase maneuverability. Such a vehicle is semi-diagrammatically shown in Figure 1 of the drawings wherein the numeral 10 designates a chassis frame having side sills 11 connected together in laterally spaced relationship by crossbars 12.

Extending in a direction transverse to the direction of length of the frame 10 beneath the latter is a pair of axles 13 and 14. The forward axle 13 is fixed against turning movement and has ground engaging wheels 14' suitably journalled thereon at opposite sides of the frame 10. The axle 13 is connected to the frame 10 by a pair of semi-elliptical leaf springs 15 extending in the direction of length of the frame 10 at opposite sides of the latter and having the central portions secured to the axle 13 by clamps 16. The opposite ends of the springs 15 are suitably operatively connected to the adjacent side sills 11 of the frame 10 in a manner to be more fully hereinafter described.

In the present instance, the rear axle 14 is indicated as a driving axle and in accordance with conventional practice comprises aligned shaft sections suitably journalled in a housing 17. Ground engaging wheels 18 are respectively secured to the outer ends of the shaft sections and the inner ends of the shaft sections are operatively connected to a suitable propeller shaft 19 through differential drive mechanism (not shown) located in the housing 17. The rear driving axle 14 is connected to the frame 10 through the medium of a double trunnion 20 suitably supported on one of the crossbars 12 of the frame. The double trunnion 20 and the means for operating the same form the subject matter of my copending application Serial Number 119,223, filed October 3, 1949, and is therefore not described in detail herein. It will suffice to point out that the double trunnion comprises an outer ring 21 and an inner ring 22 suitably pivoted at diametrically opposite sides to the outer ring for rocking movement about an axis 23 which is parallel to the axis of the axle 17. The outer ring 21 is mounted on the frame 10 midway between the side sills 11 for pivotal movement about a substantially vertical axis 24 and is positioned to enable the propeller shaft 19 to extend through the inner ring 22. The inner ring 22 is connected to the housing 17 adjacent opposite ends thereof by struts 25 with the result that the axle 14 may turn freely about the vertical axis 24 and may swing up and down about the axis 23.

The rear axle 14 is also operatively connected to the frame 10 by a pair of semi-elliptical leaf springs 27 respectively positioned at opposite sides of the frame 10. The front ends of the springs 27 are respectively connected to the rear ends of the springs 15 through the medium of chains 28 and sprockets 29. The sprockets 29 are respectively rotatably supported on the side sills 11 of the frame below the adjacent ends of the springs 15 and 27. The chains 28 are reeved around the sprockets and have the free ends respectively pivoted to the adjacent ends of the springs 15 and 27 by shackle members 30. The front ends of the springs 15 are similarly connected to the rear ends of the next adjacent springs 31 so that all of the springs cooperate to control vertical movement of the chassis frame 10.

The rear ends of the springs 27 are respectively connected to the side sills 11 of the frame 10 for both lateral movement and sliding movement fore and aft of the frame by fittings 32. The fittings 32 comprise brackets 33 and plates 34. The brackets 33 are secured to the frame and the plates 34 are mounted on the brackets for lateral shifting movements relative to the frame and for sliding movement in a direction lengthwise of the frame. The plates 34 are also respectively pivotally connected to the rear ends of the springs 27. As a result of the above construction, the springs 27 are shiftable laterally relative to the frame 10 and are slidable in the direction of length of the frame.

The central portions of the springs 27 are pivotally connected to the axle 14 in a manner to permit turning movement of the axle 14 without materially disturbing the parallel relationship between the springs 27 and the adjacent side sills 11 of the frame 10. Inasmuch as both springs 27 are connected to the axle 14 in a similar manner, only one mounting is described in detail herein. With this in view, reference is made to Figure 3 of the drawings wherein it will be noted that the housing 17 of the rear axle 14 has a flat seat 35 at the top for supporting a bracket 36. The bracket 36 is clamped against the seat by U bolts 37 which extend around the axle housing 17. Also the bracket 36 is formed with an upstanding ear portion 38 and the latter is pivoted to the spring 27 for movement about an axis extending substantially parallel to the axle 14 or axis 23 to enable swinging movement of the axle about the latter axis.

Referring again to Figure 3 of the drawings, it will be noted that the leaves of the spring 27 are clamped together by a pair of plates 39 respectively seated on the top and bottom of the spring 27 and clamped against the spring by two pairs of studs 40. As shown in Figure 6 of the drawings, the pairs of studs 40 are respectively located at opposite sides of the spring 27. The bottom plate 39 is recessed to receive the head portions 41 of the studs and the top plate 39 is recessed to receive the clamping nuts 42 on the upper ends of the studs. The leaves of the spring 27 are also held in assembled relationship by a stud 43 centrally located with respect to the studs 40 and extending vertically through a suitable opening formed in the spring 27. The axis of the stud 43 is located in a vertical plane including the axis of the axle 14 and the head portion 44 of the stud 43 is located in an opening 45 formed in the bottom plate 39. The upper end of the stud is threaded for receiving a clamping nut 47 and the top plate 39 also has a central opening 46 for receiving the nut 47.

Supported against the bottom plate 39 is a plate 48 having depending laterally spaced ears 49 adapted to receive the ear 38 therebetween and pivoted to the ear 38 by means of a stud 50 having its axis extending parallel to the axis of the axle in a common plane with the axis of the stud 43 and the axis of the axle. The arrangement is such as to enable the axle to swing relative to the springs 27 about the double trunnion axis 23.

A plate 51 is also seated on the top plate 39 of the spring clamp and is secured to the plate 48 by two pairs of studs 52. The pairs of studs 52 are respectively located at opposite sides of the spring 27 and merely serve to hold the plates 48, 51 in position relative to the plates 39. In other words, the nuts on the studs 52 are merely tightened sufficiently to hold the plates in assembled relationship and do not interfere with the desired pivotal movement of the springs. As shown in Figure 7 of the drawings, the plate 51 is centrally apertured to receive an upstanding annular portion 53 on the top plate 39 and the plate 48 is also apertured to receive an annular downwardly extending projection 54 on the bottom plate 39. The annular projections 53 and 54 are concentrically arranged with respect to the axis of the stud 43 and thereby enable pivotal movement of the plates 51 and 48 about this axis. Inasmuch as the axle 14 is connected to the plate 48, it necessarily follows that this axle is also capable of pivotal movement about the axis of the stud 43 relative to the spring 27. In this connection, attention is called to Figures 4 and 5 wherein it will be noted that the plates 39 are slotted as at 55 to provide clearance for the studs 52 during pivotal movement of the axle relative to the spring.

It follows from the foregoing that when the axle 14 is turned about the vertical axis 24 of the double trunnion 20 by ground pressures acting through the tires on the ground engaging wheels, the springs 27 may move longitudinally and laterally to some extent relative to the frame. Also the axle 14 may pivot relative to the springs so as to appreciably relieve any stress on the springs tending to move the latter out of parallel relationship to the adjacent side sills 11 of the frame 10. Thus the axle 14 is capable of relatively free turning motion without interfering with the spring suspension system.

What I claim as my invention is:

1. In a vehicle having a frame, means supporting the frame including an axle extending in a direction transverse to the frame, leaf springs extending substantially normal to the axle at opposite sides of the frame means supporting opposite ends of the springs on the frame for lateral shifting movement relative to the frame, means other than said springs for connecting the axle to the frame and permitting turning movement of the axle about an up and down axis located between the springs, and means respectively securing the springs intermediate the ends thereof to adjacent portions of the axle including mounting assemblies attached to the axle and respectively pivoted to the springs permitting pivotal movement of the springs relative to the axle about axes extending substantially parallel to the axis of turning movement of the axle.

2. The structure set forth in claim 1 having additional means for pivotally connecting the mounting assemblies to the axle permitting swinging movement of the axle relative to the springs about an axis extending generally parallel to the axle.

3. The structure set forth in claim 1 in which the axis of turning movement of the axle is spaced a substantial distance from said axle.

4. In a vehicle having a frame, means for supporting the frame including an axle, a leaf spring extending in the general direction of length of the frame, means operatively connecting opposite ends of the spring to the frame, a pair of plates respectively clamped to the top and bottom surfaces of the spring intermediate the ends thereof, a second pair of plates respectively clamped against the plates of the first pair and rotatable relative to the first pair of plates, and means for connecting one of the second pair of plates to the axle.

5. The structure set forth in claim 4 in which means is provided on the plates of one pair for pivotally engaging the adjacent plates of the other pair to permit rotation of the second pair of plates about a substantially vertical axis.

6. The structure set forth in claim 5 in which the lowermost plate of the second pair is pivoted to the axle to enable swinging movement of the axle relative to the spring about an axis extending generally parallel to the axle.

7. In a vehicle having a frame, an axle extending in a direction transverse to the frame and supported on the frame for turning movement about an up and down axis, spring means between the axle and frame including a leaf spring extending in the general direction of length of the frame, means connecting opposite ends of the spring to the frame permitting lateral shifting movement of the spring relative to the frame, a clamp secured to the spring intermediate the ends thereof, and means for securing the clamp to the axle including parts pivotally connected to the clamp for turning movement about an axis extending substantially perpendicular to the axle and permitting turning movement of the axle relative to the spring.

8. The structure set forth in claim 7 in which a bracket is secured to the axle and is pivoted to said parts for rocking movement about an axis extending generally parallel to the axle.

9. In a vehicle having a frame, an axle extending in a direction transverse to the frame and supported on the frame for turning movement about an up and down axis, a pair of leaf springs at opposite sides of the frame and having the ends connected to the frame for lateral shifting movement relative to the frame, a clamp secured to each spring intermediate the ends thereof, and means respectively securing the clamps to the axle including parts pivotally connected to the clamps for turning movement about axes extending substantially perpendicular to the axle and disposed in a common plane with the axis of said axle.

10. The structure set forth in claim 9 in which brackets are secured to the axle and are respectively pivotally connected to said parts for rocking movement about aligned axes extending generally parallel to the axle and also disposed in said common plane.

11. In a vehicle having a frame, a wheel supporting axle extending in a direction transverse to the frame, a pivotal mounting for the axle on the frame permitting turning movement of the axle in opposite directions about an up and down axis located intermediate the ends of the axle and spaced to one side of said axle, spring means between the axle and frame including a leaf spring extending in the general direction of the frame and having the opposite ends connected to the frame for lateral shifting movement relative to said frame, a clamp secured to the leaf spring intermediate the ends thereof, means for securing the clamp to the axle including parts pivotally connected to the clamp for turning movement about an axis extending substantially perpendicular to the axle and permitting turning movement of the axle about said up and down axis relative to the spring.

12. The structure defined in claim 11 having a bracket secured to the axle and pivoted to said parts for rocking movement about an axis extending substantially parallel to the axle.

ANCIL C. STOVER.

REFERENCES CITED

The following references are of record in the file of this patent:

UNITED STATES PATENTS

| Number | Name | Date |
|---|---|---|
| 1,743,892 | Hylton | Jan. 14, 1930 |
| 2,272,572 | Merry | Feb. 10, 1942 |
| 2,523,954 | Jungwirth | Sept. 26, 1950 |